March 31, 1942.  J. BLACKBURN  2,277,675
SHIFTING DEVICE
Filed Nov. 13, 1939  5 Sheets-Sheet 1
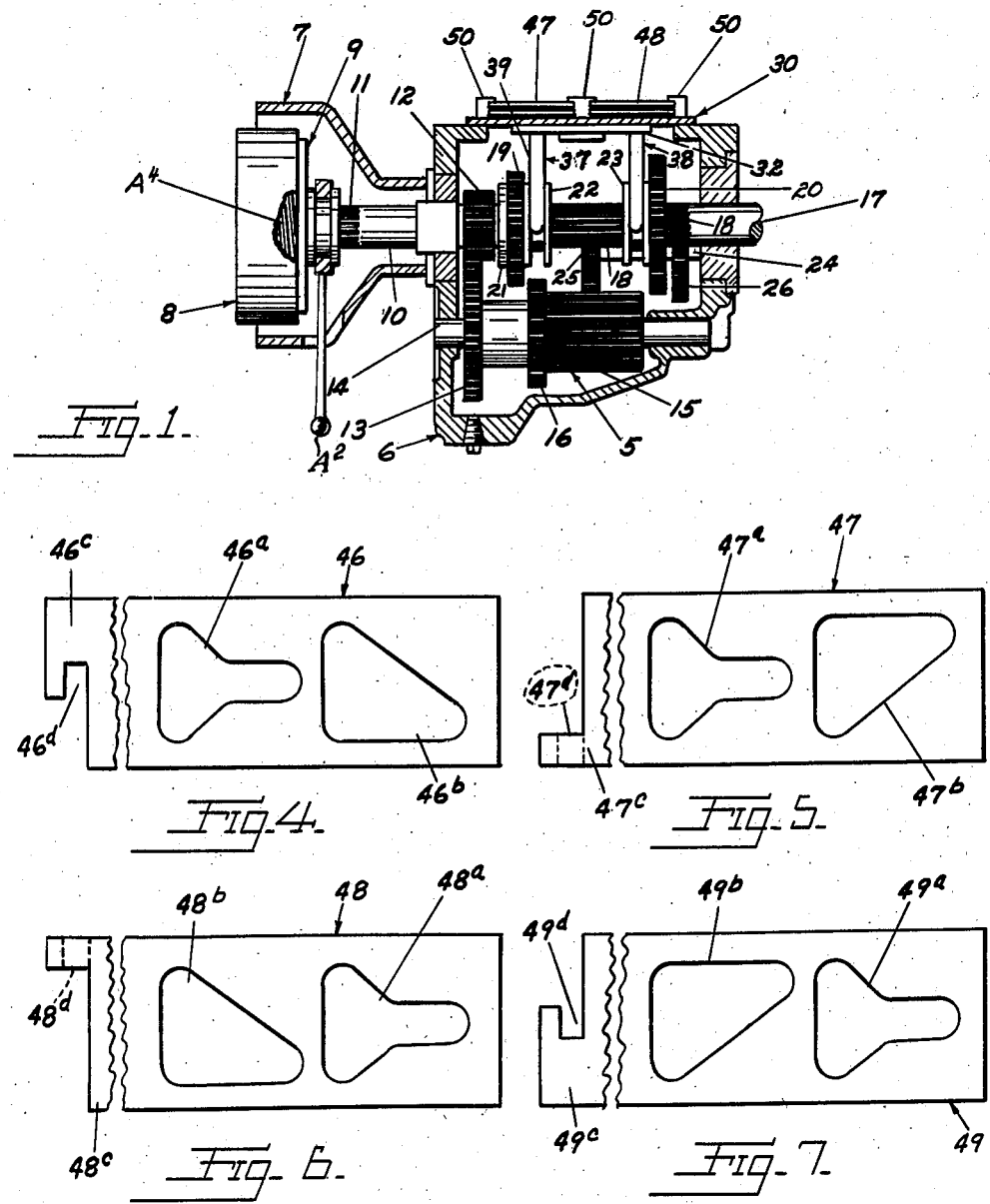
INVENTOR.
Jasper Blackburn
BY
Adam E. Fisher
ATTORNEY.

March 31, 1942.  J. BLACKBURN  2,277,675
SHIFTING DEVICE
Filed Nov. 13, 1939   5 Sheets-Sheet 2
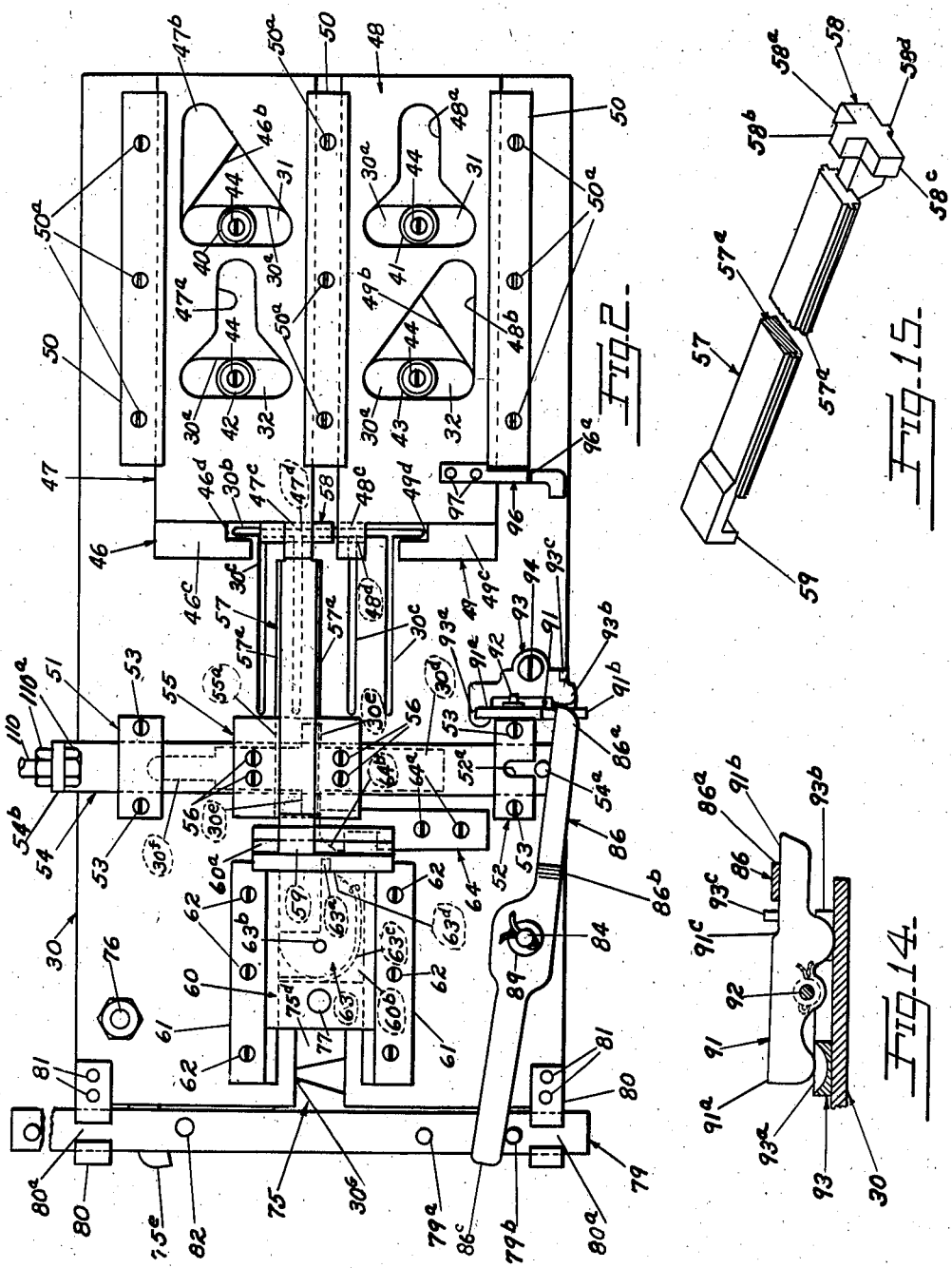
INVENTOR.
Jasper Blackburn
BY Adam E. Fisher
ATTORNEY.

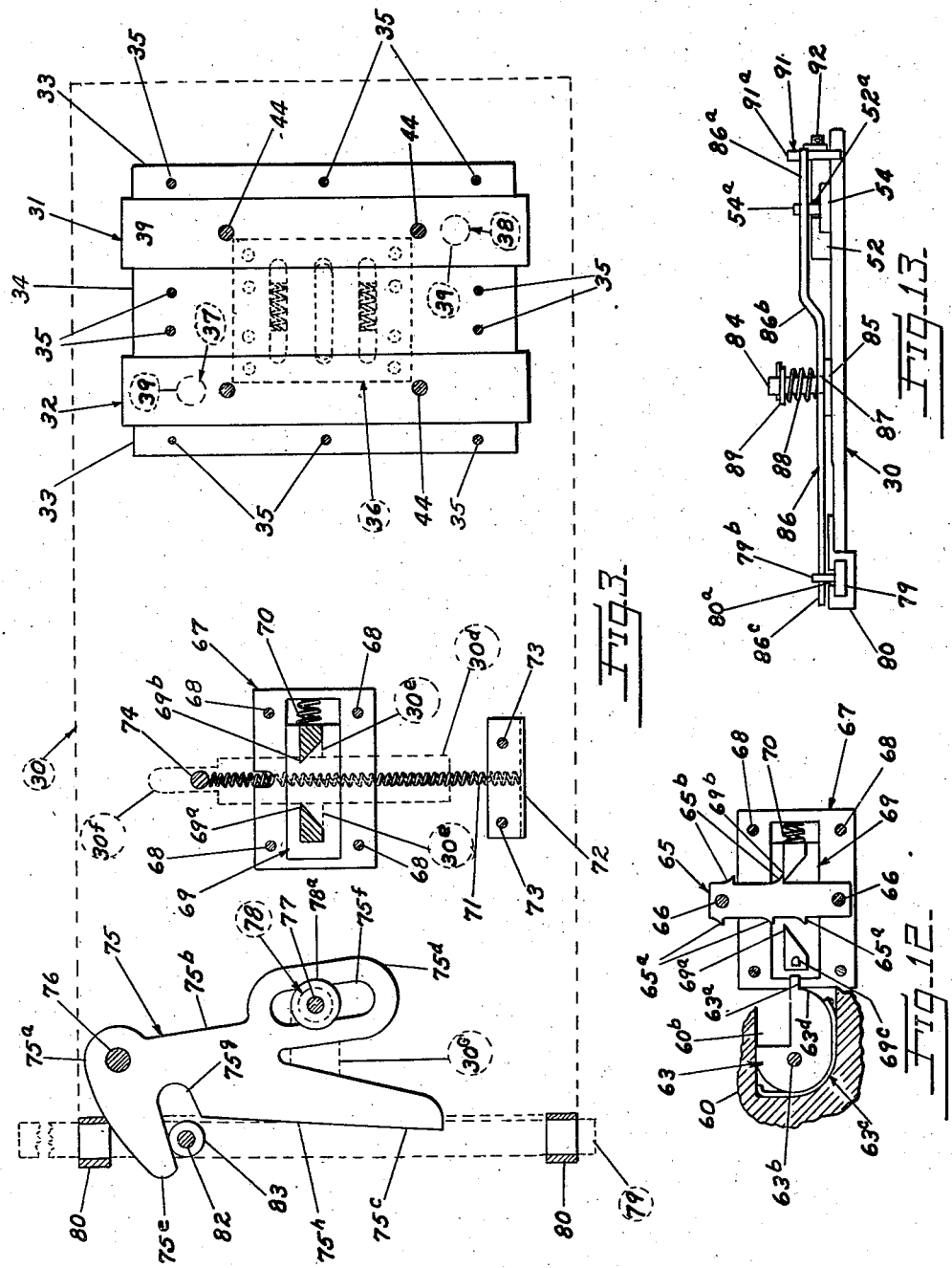

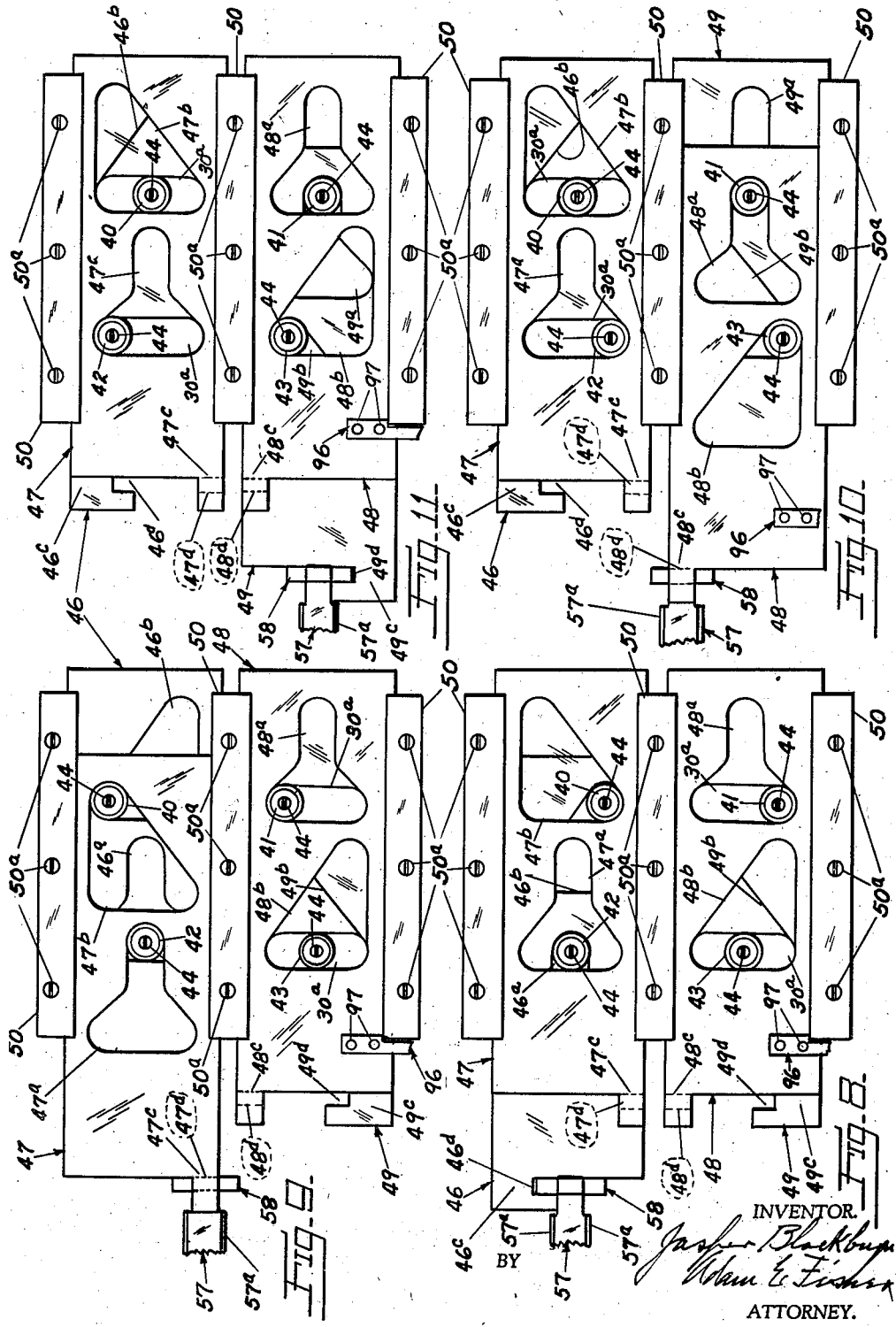

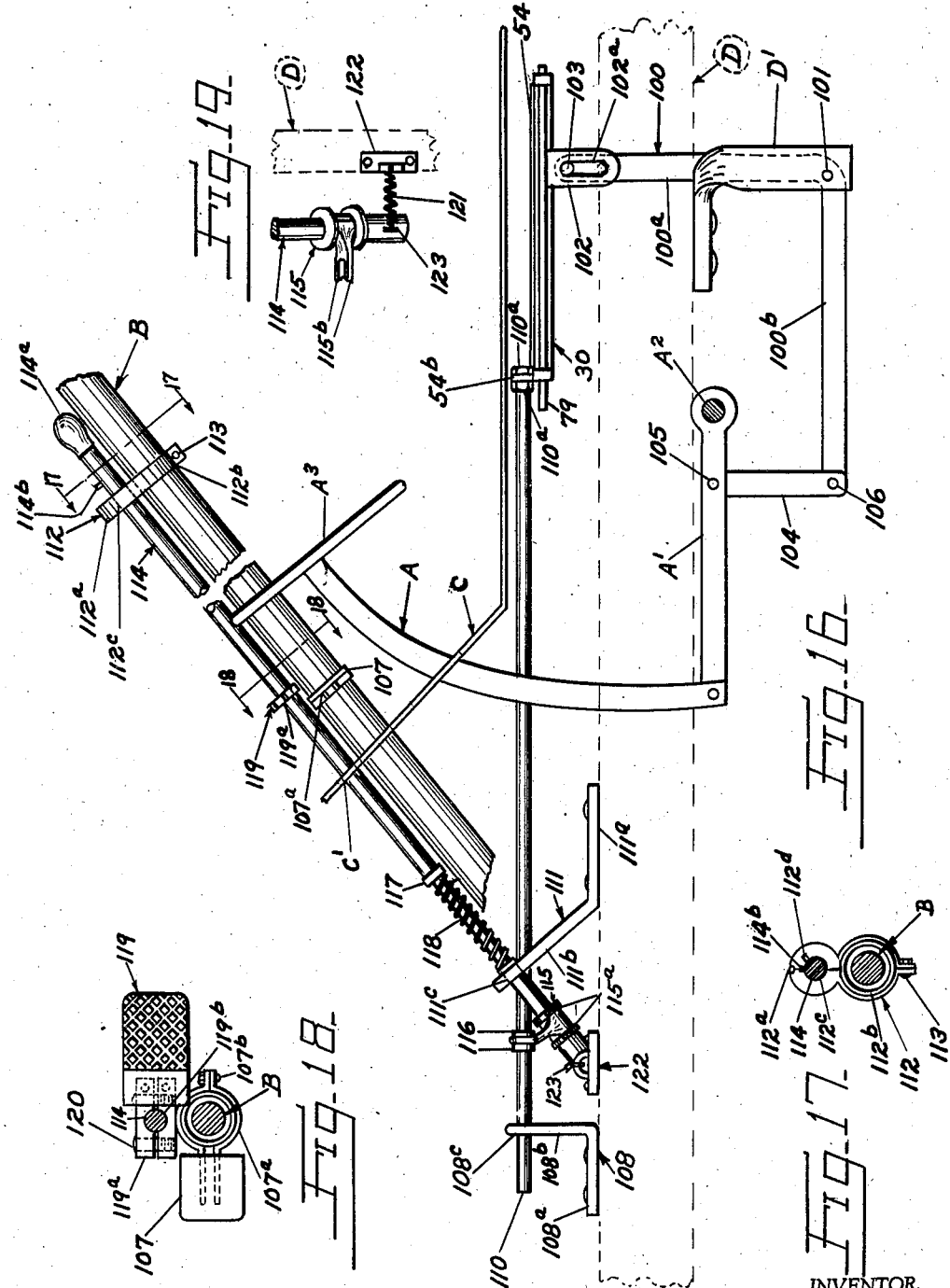

Patented Mar. 31, 1942

2,277,675

UNITED STATES PATENT OFFICE 2,277,675

SHIFTING DEVICE

Jasper Blackburn, Webster Groves, Mo.

Application November 13, 1939, Serial No. 304,038

12 Claims. (Cl. 192—3.5)

This invention is an improvement upon my United States Patent #1,709,557, April 16, 1929, and relates to gear shift devices and gear shifting mechanisms for installation upon and use in connection with automotive vehicles as driven by internal combustion engines. The invention however might be applied to any situation, or to any speed gear assembly requiring or providing for changing from one speed to another in the operation of the machine with which it is associated.

The chief object of the invention is to provide semi-automatic gear shifting mechanism for mounting over or upon conventional forms of speed transmission units as assembled in automotive vehicles, and whereby as the vehicle is running in a certain speed, as in first or low, or in second, or in third or high, the next required speed for the vehicle may be preselected by the driver and the mechanism set accordingly through the manipulation of levers, including the clutch pedal of the vehicle.

Another object of the invention is to provide a semi-automatic speed shifting unit for installation upon the transmission gear system of an automotive vehicle, the same including an oblong base plate for mounting transversely and horizontally over the gear assembly of the vehicle, with the left hand end of the plate extended laterally outward in alignment with the clutch lever assembly and steering mechanism of the vehicle, shifter bars slidably mounted side by side at the under side of the inner or right hand end of the plate over the transmission gear assembly of the vehicle, the said bars being arranged to slide back and forth in parallel paths over, and in parallel relation to, the shafts carrying the several speed-gears of the transmission unit, rollers mounted on the upper sides of the shifter bars at each end of each bar, and extended up through elongate slots formed in the base plate for the purpose, shifter forks extended from the said shifter bars and disposed and arranged in collars at the several gears, to slide the gears backward and forward upon their shafts, as required in changing from one speed to another, a number of flat, elongated shifter plates corresponding in number with the several speeds provided for by the transmission unit, the shifter plates being mounted longitudinally of the base plate and transversely of the said shifter bars, and being arranged to slide back and forth in parallel paths, the shifter plates having angular cut-outs engaging the said rollers of the shifter bars for co-operatively moving same as required in the process of changing or shifting from one speed to another in the operation of the vehicle, and means adapted to connect with said shifter plates for selecting the requisite plate and operating same to impart the required speed to the vehicle.

Still another object of the invention is to provide in combination with or for installation upon the conventional speed transmission gear assembly of a vari-speed motor vehicle, a semi-automatic gear shift unit, comprising elements for engaging and controlling the several shift gears of the gear assembly, elements for attachment to the clutch lever assembly, elements operatively connecting the two last named elements for manipulating the former through the latter, and elements extended to the hand of the operator for resetting the said gear controlling elements.

With the foregoing and such other objects and advantages in view as may appear from the specification, attention is now directed to the accompanying drawings wherein is exemplified a preferred embodiment of the invention, and wherein:

Fig. 1 is a vertical longitudinal section of a sliding gear transmission showing the engine flywheel and clutch and the shifting device medially disposed on top of the gear housing, the gears being in neutral position.

Fig. 2 is a top plan view of such of the elements of the invention as are disposed upon the upper side of the base plate, said elements being so disposed through shifting the transmission gear unit into neutral.

Fig. 3 is a plan view of the elements of the invention as disposed at the under side of the base plate, same being so disposed through shifting the gear unit into neutral, the base plate itself, and to which these elements are normally attached at the underside, being removed.

Fig. 4 is a plan view of the reverse shifting element or plate.

Fig. 5 is a plan view of the first speed shifting element or plate.

Fig. 6 is a similar view of the second speed element or plate.

Fig. 7 is a similar view of the high or third speed element or plate.

Fig. 8 is a diagrammatic view of the shifting elements as positioned and operated for shifting the gears of the transmission into reverse.

Fig. 9 is a similar view showing the shifting elements as positioned and operated for selecting first speed.

Fig. 10 is a similar view showing the shifting elements as positioned when operated for shifting into second speed.

Fig. 11 is a diagrammatic view showing the shifting elements as positioned when operated for shifting into high or third speed.

Fig. 12 is an enlarged top plan view of the escapement and pawl plates and cam for releasing the same.

Fig. 13 is an enlarged side elevation of the resetting lever as disposed along the back left hand margin of the base plate.

Fig. 14 is an enlarged detail of the oscillating cam block.

Fig. 15 is an enlarged detail of the selector arm, a medial section being broken out.

Fig. 16 is a diagrammatic side elevation showing the connections between the clutch operating mechanism, the shifting mechanism, the resetting rod as disposed along the steering column and the attachment to the carirer bar.

Fig. 17 is a reduced cross-section on the line 17—17 of Figure 16.

Fig. 18 is an enlarged cross-section on the line 18—18 of Fig. 16.

Fig. 19 is a sectional detail of the sleeve and finger assembly for the lower end of the resetting rod.

The invention is designed for application to and use upon any conventional form of speed gear transmission assembly, here represented generally at 5, as commonly used on an automotive vehicle of the internal combustion or gas engine type, and which usually includes a gear case 6, attached fly-wheel housing 7 with flywheel 8 and clutch 9 mounted therein upon a drive shaft 10 to which the clutch is splined at 11 for releasable engagement with the flywheel.

The clutch mechanism is thus of conventional form and is normally held engaged by the spring A4, (see Figure 1) but may be retracted upon the shaft 10, and thus disengaged by conventional connections with the clutch lever unit A of the car, whereby as this lever is depressed the clutch 9 is retracted. These connections are conventional and hence not here shown as this invention does not involve same.

The drive shaft 10 extends into the case 6, and has rigidly mounted on its rear end a drive gear 12. This gear meshes with the gear 13 on a counter shaft 14 journaled in the case or housing 6. The shaft 14 also carries the first and second speed gears 15 and 16.

The driven shaft 17 has its forward end journaled in the end of the shaft 10, while the rear end is journaled through the rear of the casing 6 and is adapted for the reception of a universal joint (not shown.) The shaft 17 is splined as at 18 and shift gears 19 and 20 are slidably mounted thereon. The gear 19 has a collar 21 extended forwardly thereof, the same being provided with internal gear teeth. These teeth are of conventional formation as used in standard transmissions, and hence are not here shown. The internal gear teeth of the collar 21 are designed to engage with the spur teeth of the gear 12, for high speed, when the forward gear 19 is shifted forwardly for that purpose. The gear 19 also carries at its rear side a grooved shift collar 22 for engaging a shifter fork later to be described. The other gear 20 has a similar grooved collar 23 at its forward side, for a similar purpose.

Journaled also within the casing 6 is another counter-shaft 24 carrying the two reversing gears 25 and 26, the forward gear 25 being constantly in mesh with the gear 15, and the rearward gear 26 running free. With the engine drive shaft 10 revolving clock-wise (relative to the driver looking forwardly), and assuming that this results in the forward travel of the vehicle, the gears 25 and 26 of the counter-shaft 24 will revolve in the same direction because of the gears 13 and 25 being constantly in mesh with the gears 12 and 15 respectively. Thus, when the shift gear 20 is moved rearwardly into mesh with the gear 26, the driven shaft 17 will revolve anti-clockwise and the vehicle will move backward. When the gear 20 is moved forwardly into mesh with the gear 15, the shaft 17 will revolve clockwise and the vehicle will move forwardly in "first speed." With the gear 20 moved rearward again, and turning freely between the gears 15 and 26, and the shift gear 19 being then moved also rearward into mesh with the gear 16, the vehicle will move forwardly in "second speed." By then moving the gear 19 forwardly, the internal gear teeth of the collar 21 mesh with the gear 12 of the engine drive shaft 10 and the vehicle moves forwardly in "high speed."

When the transmission gears are relatively positioned as shown in Figure 1, the gears are in their neutral position, since the gears 19 and 20 are not in mesh with other gears.

In practising my invention, the top plate or cover of the conventional gear housing or casing 6 is removed, and a plate 30 is substituted therefor, this plate being herein styled and referred to as a "base plate." As here shown this plate is oblong and is positioned with its right end secured upon the casing and with its left hand end extended laterally of the casing and in operative alignment with the clutch lever mechanism A and the steering post and mechanism B of the vehicle, as extended up through the floor C supported on the car frame D. Of course in an automobile having its steering wheel and mechanism on the right hand side, the arrangement of the base plate and attached elements would be reversed.

At the under side of the inner or right-hand end of the base plate 30, are mounted side by side, a pair of shifter bars 31 and 32 slidably supported between outer guide strips 33 and an inner guide plate 34, all secured by screws 35 to the under side of the plate. The arrangement is such that the bars 31 and 32 are adapted to slide or reciprocate over the gear assembly 5 in parallelism with the gear shafts 10, 14, 17 and 24.

In the shifting operations later referred to, the bars 31 and 32 control the gear combinations of the several speeds and these bars are releasably held to any set position for a given gear combination, by means of a conventional interlock combination 36, mounted at the under sides of the inner guide plate 34 and of the bars 31 and 32. Shifter forks 37 and 38 engage the shift collars 22 and 23 respectively, and are rigidly joined by their shank portions 39 to the shifter bars 31 and 32. Rearward or forward movement of the inner or right hand bar 31 and fork 38 reverses the vehicle or imparts first speed forward, respectively, while similar movement of the left hand bar 32 and fork 37 imparts second and third speeds forward, the gears meshing as above described.

The shifter bars 31 and 32 each have spaced rollers at their upper sides, the rollers of the bar 31 being shown at 40 and 41, and those of the bar 32 at 42 and 43. These rollers are rotatably mounted over studs 44 seated in the bars. The rollers mounted as described, pass up through elongated slots 30a formed in the base plate 30, and which slots extend parallel with the bars 31 and 32, and thus permit the rollers to move back and forth therein, in the operation of the device.

Two pairs of superposed, elongated and apertured shifter plates 46—47 and 48—49, are slidably mounted, one pair in advance of the other, at the upper side of the plate 30, transversely over the shifter bars 31 and 32. These plates are held slidably in position between guide strips 50 secured by screws 50a to the upper side of the plate 30.

The forwardly positioned pair of plates 46—47 constitute respectively the reversing and first speed plates, with the reversing plate 46 positioned underneath the first speed plate 47. The rearwardly positioned pair of plates 48—49 constitute respectively the second and third speed plates, the former being positioned over the latter. All of these plates are formed with spaced angular openings at their ends for engaging the rollers 40—41 and 42—43 of the shifter bars 31—32, for properly operating those shifter bars and the connected gears in manner now to be described.

The angular openings or apertures of the lower, forward, or reversing plate 46, are shown at 46a—46b, and those of the upper, forward, or first speed plate 47 are shown at 47a—47b. The openings of the upper, rearward, or second speed plate 48 are shown at 48a—48b, and those of the lower, rearward, or third speed plate, are shown at 49a—49b.

The angular openings 46a, 47a, 48a, 49a of the two pairs of shifter plates are all Y shaped and in the assembly are diagonally disposed as to the pairs, upon the base plate 30, while the remaining openings 46b, 47b, 48b, 49b, of the plates, are of the form of right angled triangles with their diagonal margins oppositely turned, as shown in Figure 2. In other words the diagonal margin of the opening 46b of plate 46 extends rearwardly from left to right, so that as the plate moves to the left this margin will impinge the roller 40, moving it and the bar 31 rearwardly and causing the shift gear 20 to mesh with the reversing gear 26. The diagonal margin of the opening 47b of plate 47 extends reversely forwardly, and so that as this plate moves to the left the roller 40, bar 31 and gear 20 will be mover forwardly, throwing gear 20 into mesh with the first speed gear 15. The diagonal margin of the opening 48b of plate 48 extends rearwardly from left to right, so that as this plate slides to the left, this margin will impinge the roller 43, moving it and the bar 32 rearwardly and causing the shift gear 19 to mesh with the second speed gear 16. The diagonal margin of the opening 49b of plate 49 extends reversely forwardly, and so that as this plate moves to the left, the roller 43, bar 32, gear 19 and gear collar 21 will all be moved forwardly, throwing the gear collar 21 over the direct drive gear 12 and the internal teeth thereof into mesh therewith, for third speed forward.

As shown in Figure 2, when the four shifter plates are all drawn toward the right, or inwardly (relative to the vehicle on which the device is mounted), the arrangement is such that the several angular openings through the plates all present aligned, rectilinear margins at their outer or left hand ends, which margins abut the several rollers 40, 41, 42, 43. Also, with the transmission gears 19 and 20 in their neutral position, as in Figure 1, the rollers will stand medially positioned at said margins, as in Figure 2, in direct alignment with the central slots of the Y shaped openings of the plates and so as to pass thereinto as the plates are moved transversely over to the left. Thus it will be seen that each pair of the shifter plates have both Y shaped or "neutral" openings or slots and right-angled or "gear-mesh" openings therein, located respectively over the two-shifter bars 31 and 32. By this arrangement, should any of the transmission gears be in mesh at the moment of shifting from one speed to another, the centrally inclined margins of the neutral Y shaped opening of the same plate being operated for making the gear shift on one of the shifter bars, will simultaneously operate the roller (41 or 42) of the other shifter bar, and will move that bar and the meshing gear thereon, into neutral position, so that there can be no possible clash or interference in the shifting. This operation is facilitated from the fact that the angular margins of the neutral, Y shaped openings of the plates, leading to the central stems of the openings are somewhat shorter and steeper than the diagonal margins of the right-angled gear-mesh openings, causing the former to work a little in advance of the latter.

The several shifter plates are formed or provided at their left ends with necks 46c, 47c, 48c, 49c, formed with latch-notches 46d, 47d, 48d, 49d. The necks and latch-notches are so arranged and formed that the necks extend in a suitably spaced relation, and the notches all face centrally in a common transverse plane extended perpendicularly to the base plate 30, the notches 46d—49d being turned inwardly toward one another in alignment and in parallel relation to the plate 30, and the notches 47d—48d being turned downward perpendicularly towards said plate 30. The purpose of this arrangement will later appear.

Front and rear guide loops 51, 52 are anchored at 53 to the upper side of the base plate 30 in spaced relation to the left ends and necks of the assembled shifter plates, and a selector arm carrier bar 54 is slidably mounted through these loops. A saddle plate 55 is anchored at 56 medially atop the bar 54, and has an undercut guide channel or groove 55a formed transversely through its upper face. A shifter plate selector arm 57 is slidably mounted in this groove, the same being feathered along its lower margins as shown at 57a for engaging the undercuts of the channel or groove 55a, and whereby the arm 57 is held in place upon the saddle plate 55. Thus the plate 55 is adapted for movement in parallel spaced relation to the necks of the shifter plates, and the selector arm 57 is adapted to slide to or from these plates in parallelism with the lines of movement of the plates. The right hand end of the arm 57 is provided with a head 58 (see Figure 15) formed with radially extended lobes 58a, 58b, 58c, the lobes 58a, 58c extending laterally and being adapted for engagement with the notches 46d and 49d of the lower plates 46 and 49, and the lobe 58b extending centrally upward and being adapted for separate engagement with the notches 47d and 48d of the upper plates 47 and 48.

In addition to the plate engaging lobes of the head 58, a guide lug 58d depends at the under side of this head into a lug-slot 30b formed in the plate 30 between the necks of the plates. Leftward from this slot extend four spaced and parallel guide grooves 30c. The spacing of these grooves is equal to the extent of travel of the head 58 in selecting and operating the shifter plates in sequence, and these grooves engage the lug 58d and guide the head 58 in its reciprocating movements to and from the shifter plate assembly, in the operation of the plates in sequence. Thus by sliding the arm 57 toward these shifter plates, and the head 58 into the central space between the necks thereof and then moving the saddle plate 55 and arm 57 forwardly or backwardly, as may be required, one of the lobes of the head 58 may enter either of the notches 46d, 47d, 48d, 49d, after which by sliding the arm 57 reversely to the left, the selected shifter plate may be drawn out to the left, thus operating the shifter gears as desired and as already explained. The left hand end of the arm 57 is formed with a down turned lip 59.

A rectangular selector arm draw plate 60 is slidably mounted between guide strips 61 secured by rivets or screws 62 medially to the left end of the base plate 30, at the upper side thereof, the arrangement being such that the plate 60 may slide back and forth in parallelism with the line of movement of the selector arm 57. A groove 60a is formed along the right hand margin of the plate 60 adapted to slidably engage the lip 59 of the arm 57, and wherein the lip is so located. After the desired shifter plate is selected, in manner described, by the three-lobed head 58, the left-ward movement of the plate 60 will draw such shifter plate outward into operative position as to the shift gears, as described. A shallow, rectangular recess 60b is formed in the under side of the plate 60, opening out through the inner right hand margin thereof, and a flat, ovate cam 63 having an outwardly extended nose 63a, is pivoted at 63b within this recess, the cam being spring-set as shown at 63c to normally hold the nose 63a turned straightly inward toward the right hand, the spring 63c however permitting the nose to be deflected forwardly, in the operation of the device. This forward deflection of the nose 63c is caused by the rounded shoulder 63d of the cam impinging a beveled plate 64 secured by screws 64a to the plate 30. The purpose of this arrangement will appear later.

An elongated slot 30d is cut medially through the plate 30 immediately under the carrier bar 54 and an oblong escapement plate 65 is secured by screws 66 to the under side of the bar 54 and adapted to reciprocate lengthwise through the slot 30d as the bar 54 moves back and forth through the loops 51, 52.

Sets of forwardly sloped or beveled escapement ratches or teeth 65a, 65b are formed in spaced and stepped relation along the lateral margins of the plate 65. There are three of the teeth 65a on the left margin, referred as "interceptor teeth," and two teeth 65b on the right margin, referred to as "plate selector teeth," there being one such selector tooth each for the first and second speed shifter plates and for controlling same, as will be later described.

A shallow, elongated housing 67, open at one side, is mounted at its open side transversely over the plate 65 by screws 68 passed through its margins into the plate 30.

A flat, elongated pawl plate 69 is freely seated in the housing 67, this plate being shorter than the housing and thus adapted to slide back and forth endwise therein. A pair of spaced pawl teeth 69a, 69b, are raised from one side of the plate at each end thereof, in transverse alignment with each other. These pawl teeth play within slots 30e extended laterally from the slot 30d, and the teeth are beveled off inwardly toward each other. This plate is mounted in its housing in such manner that the straight sides or margins of the teeth are turned forwardly at either side of the escapement teeth 65a, 65b, and in opposition to the rearwardly turned straight margins of the same. Thus a perfect interlocking action is provided for the two sets of teeth, whereby the straight sides or points of the pawl teeth of the plate 69 may sharply engage the straight sides of the ratchet teeth of the escapement plate 65 to releasably lock same against movement. The space between the points of the teeth 69a, 69b of the pawl plate 69 is slightly greater than the width of the escapement plate 65 inside the teeth thereof, but said space is slightly less than the outer imaginary straight lines connecting and demarking the extremities of the escapement teeth 65a, 65b. By this arrangement and relation between the pawl teeth and the stepped escapement teeth of the plate 65, the latter may be moved rearwardly step by step or "tooth by tooth" lengthwise between the pawl teeth 69a, 69b, by oscillating the plate 69 lengthwise in its housing. A small stop or lug 69c is raised from the face of the left hand pawl tooth 69a in alignment with the nose 63a of the cam 63. An expansion coil spring 70 is mounted within the right hand end of the housing 67 and is braced between the end of the housing and the end of the pawl plate 69, this spring serving to urge the plate 69 outwardly or towards the left of the assembly. A coiled pull spring 71 is drawn and secured at its ends between a bracket 72 secured rearwardly at 73 to the under side of the plate 30 and a pin 74 seated in the forward end of the carrier bar 54, the pin traveling in a narrowed slot 30f extended longitudinally from the slot 30d. The action of the spring 71 is to tend to draw the bar 54 rearwardly, when it is free to so move. With the elements last described so assembled, and as the pawl plate 69 is oscillated from side to side lengthwise within its housing, with the spring 71 tending to draw the bar 54 rearwardly, the pawl teeth 69a, 69b will alternately engage one of the stepped ratchet teeth 65a, 65b of the escapement plate 65, and hold that plate as well as the carrier bar 54, draw plate 60, selector arm 57 and its attached shifter plate as selected, in set position, until the pawl plate is oscillated reversely in its housing and the escapement plate travels rearwardly again under the pull of the spring 71, until the opposite pawl plate tooth engages with an opposite escapement plate tooth, and the assembly becomes set and locked in a new position. The stepped disposition, arrangement and relative spacing of the ratchet teeth 65a, 65b, upon the escapement plate 65 is such that each successive rearward movement of that plate and attached carrier bar 54 from one tooth 65b to the next one, will move the selector arm 57 rearwardly just enough to bring one of the lobes of the selector head 58 into engagement with the next one of the shifter plates desired in the sequence of gear shifts. The oscillation of the pawl plate 69 and the resulting step by step, rearward movement of the escapement plate 65 is automatically caused by the reciprocation of the draw plate 60 as will be later described. No plate selector teeth are provided on the plate 65 for aligning the selector arm 57 and head 58 with the reverse and third speed shifter plates 46 and 49, for the reason that the loops 51 and 52 are so located on the base plate 30 as to stop the saddle plate at either end of its travel, with the arm 57 thus properly aligned with said plates, and as will be later explained.

A draw plate operating lever 75 is pivotally mounted at the under side of the left hand end of the plate 30 upon a stud 76 seated near the forward margin of the plate. The lever 75 is formed with a head 75a through which the stud 76 is passed, an elongated body portion 75b extending rearwardly across the left margin of the plate 30 at the underside thereof, outer and inner legs 75c, 75d, and a nose 75e extending laterally outward beyond the left end of the plate 30. The inner leg 75d is formed with an elongated opening or slot 75f extending substantially parallel with the axis of the body 75b, and another elongated slot or mouth 75g is formed inwardly or rearwardly of the nose 75e, and extends laterally substantially perpendicularly to the axis of the body portion and opens out through the left hand or outer margin 75h of the body 75b. This left hand margin of the body portion is straight and regular as shown, and the nose 75e projects outward beyond this margin as well as beyond the base plate 30.

An elongated slot 30g is cut medially through the left end of the plate 30 under the draw plate 60 and transversely over the slot 75f of the leg 75d of the lever 75. A stud or pin 77 is anchored at one end in the under side of the left margin of the draw plate 60, and is passed down through the slot 30g of plate 30 and medially through the slot 75f of the leg 75d of lever 75, and a flanged roller 78 is rotatably mounted on this stud inside the slot 75f, the flange 78a of the roller outwardly engaging the margins of the slot to maintain the lever in position.

A clutch operated slide bar 79 is slidably mounted through lops 80, parted at their upper sides as shown at 80a and secured at 81 to the front and rear margins of the plate 30 and extended outward over the left end of that plate.

A stud 82 is anchored in the under side of the bar 79 inward of the nose 75e of the lever 75, and a roller 83 is rotatably mounted on this stud, the said roller being dimensioned to pass within the slot 75g of said lever 75, in the operation of the device. When the slide bar 79 is projected outwardly or forwardly, the roller 83 engages the nose 75e of lever 75, projecting the legs 75c—75d outwardly to the left, the leg 75c overlapping the end of the plate. Simultaneously the outward swing of the leg 75d acts through the roller 78 to pull the draw plate 60 and the shifter plate selector arm 57 over towards the left hand end of the plate 30, drawing with it one of the shifter plates, the latter being selected in a manner to be described.

A pin 84 (see Figure 13) is seated in the rear margin of the plate 30, at the upper side and adjacent the left end thereof, and a base washer 85 of appreciable thickness is mounted thereover. A carrier bar resetting lever 86 having a medial aperture 87 is pivotally mounted over this pin, as passed through said aperture, and a coil compression spring 88 is seated over the upper end of this pin and braced between the lever and a washer 89 keyed to the extremity of the pin. The lever 86 is disposed angularly along the rear margin of the plate 30 and the inner or right-hand end 86a thereof is raised as shown at 86b above the horizontal plane of the outer or left hand end 86c and overlaps and extends laterally beyond the rear end of the said carrier bar 54 and over a resetting pin 54a seated in the rear end of this bar.

Owing to the resilient mounting of the lever 86 through the spring 88, the right end of the lever 86 may be either lowered so as to fall in rearwardly of the pin 54a, for the purpose of forcing the bar 54 forwardly and "resetting" it, or the right hand end of said lever may be elevated, by means to be pointed out, for enabling this right hand end of the lever to ride above the pin 54a for permitting the rearward movement of the bar 54, in the operation of the device. The outer or left hand end of the lever 86 extends out over the slide bar 79 and is disposed freely between two pins 79a, 79b seated in a spaced relation upon the rear end of the bar 79, the said pins being set far enough apart to permit a considerable longitudinal movement of the bar 79 either forwardly or rearwardly before the approaching pin will contact the end of the lever 86 and oscillate the same as required in the operation of the device. A notch 52a is cut in the rear loop 52 to accommodate the pin 54a in its forward movement.

An elongated elevator cam block 91 (see Figure 14), formed with a forwardly disposed upper shoulder or ledge 91a and a rearwardly disposed and gradiently connected lower shoulder or ledge 91b, is pivoted by means of a pin 92 passed medially and horizontally through the block into the right end of the rear carries bar loop 52, the block 91 being slightly raised above the plate 30 and being counterbalanced to normally rock rearwardly upon its pivot pin. Thus this block may be rocked forwardly and rearwardly upon its pivot pin 92 in the operation of the device.

An arcuate or bow-shaped wedge element or latch 93 is pivotally mounted at the right hand side of the cam block 91, by means of a screw 94 passed medially through the latch into the base plate 30. This latch includes forwardly and rearwardly disposed wedges 93a, 93b, arranged and positioned so that upon the oscillation of this latch the wedges will be forced alternately under the forward or rear end of the block 91, thus slightly elevate that end and lower the opposite end, as required in the operation of the device and as later explained. As positioned in the assembly, the element 93 is located on the plate 30 in alignment with and in suitable spaced relation to the left end of the third speed shifter plate 49, so that as said plate is drawn out to the left for throwing the vehicle into third speed, the rear corner of the left or advancing end of the plate will impinge the forward end of the latch 93 and force the wedge 93a underneath the forward end or shoulder 91a of the block 91, thereby bracing that shoulder to its raised position. A contact pin 93c is extended up vertically from the rear portion of the wedge latch 93.

A trip-finger 96 is anchored at 97 by its inner end to the rear, left hand corner of the rear and upper or second speed shifter plate 48, its outer end being extended rearwardly and bent down as indicated at 96a, and thus adapted to impinge the pin 93c upon the left hand movement or extension of the second speed plate 48, and force the wedge 93b underneath the rear shoulder 91b of the block 91, thereby raising the rear end of the block and lowering the forward end thereof, the wedge 93a being simultaneously withdrawn of course.

When the cam block 91 is rocked rearwardly through the oscillation of the wedge latch 93, the right end of the carrier bar resetting lever 86, as it moves rearwardly, passes over the top of the resetting pin 54a and is pressed down back thereof by the spring 88, after which the reverse movement of the lever forces the pin 54a and carrier bar 54 forwardly into its reset position. Conversely when the block 91 is rocked forwardly, the end of the lever 86 is enabled to move forwardly up the gradient 91c defining the shoulders 91a and 91b, and onto the top of the pin 54a. The formation, arrangement and timing of the elements are such that the resetting of the bar 54 concurs with the movement of the end of the lever 86 upwardly over the gradient 91c onto the top of the pin 54a, whence it may move rearwardly again for repetition of the sequence of gear shifts. To enable the operation of the shifting mechanism through the clutch A, a bellcrank lever 100 is pivoted at 101 to a bracket D1 extended from the car frame D, below the gear assembly 5, rearwardly of the clutch A and in longitudinal and operative alignment therewith, one arm 100a of the lever being extended vertically towards the slide bar 79, and the other arm 100b horizontally forward below the clutch pedal. Spaced ears 102 are extended from the slide bar 79, the same being slotted in transverse alignment as shown at 102a to slidably engage a pin 103 seated through the extremity of the arm 100a. A short link 104 vertically connects by means of pins 105, 106, the rearwardly extended reach A1 of the conventional clutch lever unit A, with the forward end of the reach or arm 100b. The rear end of the reach or arm A1 is pivotally pinned at A2 to the car frame D. Downward pressure upon the pedal A3 forces the slide bar 79 forwardly and operates the gear shifting mechanism. A stop 107 is mounted on steering post B adjacent and somewhat below the clutch pedal A3, and depression of the pedal until the foot strikes this stop, serves to release the clutch friction cone 9 from the flywheel 8, without shifting the gears. The stop 107 is secured to the post B by a parted ring 107a and bolt 107b. The spring A4 normally returns the clutch to position after each operation, in conventional manner.

An angle bracket 108 is secured by one leg 108a to the frame of the car forwardly of the steering post B, the other leg 108b being extended vertically and having an eye 108c formed therethrough. This bracket is mounted forwardly of the steering post B, in substantial longitudinal alignment therewith but slightly to the right thereof, and with the eye 108c in longitudinal alignment with a similar eye 54b provided at the forward extremity of the selector arm carrier bar 54. An operating rod 110 is passed through the eyes 54b, 108c, the rear end of this rod passing through the eye 54b being threaded and adjustment nuts 110a being turned up at each side of the eye for adjustably securing this end of the rod. The forward end of the rod 110 may reciprocate freely through the eye 108c, in the operation of the device.

An angular bracket 111 is secured by one leg 111a to the car frame back of the steering post B, the other leg 111b being extended angularly forward of the steering post B, there being a circular aperture 111c formed through its end in front of the steering post.

An upper bracket 112 is mounted near the upper end of the steering post B, same being a two part bracket hinged together at 112a, having a circular aperture 112b for embracing the post and a smaller aperture 112c forwardly of the post and aligned with the aperture 111c of the bracket 111. A bolt 113 passed through the rear ends of the parts of the bracket, serves to lock the bracket to the post. A notch 112d is extended radially from the aperture 112c spaced angularly towards the right hand.

A resetting rod 114 is passed slidably down through the apertures 111c, 112c and through the floor aperture C1, the upper end thereof having a handle 114a and a stop pin 114b protruded laterally from the rod below the handle, this pin being formed and adapted to slide vertically through the notch 112d. A sleeve 115 is anchored by set screws 115a upon the lower end of the rod 114 below the operating rod 110, and spaced fingers 115b are extended from the sleeve upwardly at either side of the rod 110. Stops 116 upon the rod 110, at either side of the fingers 115b lock the fingers against longitudinal movement on said rod, though permitting the rod to be rotated. Downward push upon the rod 114 operates through the connections 115, 115b, 116, upon the operating rod 110, to force this rod and the connected carrier bar 54 forwardly, and the arrangement is such that with the pin 114b pushed down into contact with the upper margin of the bracket 112, the carrier bar 54 will be in its advanced, low gear position. If the rod 114 be then rotated clockwise the pin may be pushed down through the notch 112d (see Figure 17) and the bar 54 advanced still further, into its reverse gear position. A collar 117 is anchored upon the rod 114 above the bracket 111, and a suitably strong coil spring 118 is compressed between the bracket leg 111b and the collar 117, the normal action of the spring being to force the resetting rod 114 upwardly as the carrier arm 54 moves rearwardly in the operation of the device, under the pull of the spring 71. A pedal 119 is mounted on the rod 114 above the floor C, by means of a parted bracket 119a riveted to the pedal and secured by bolts 120 firmly to the rod, the parts of the bracket being formed with semi-circular recesses 119b for embracing the rod at either side. A coil spring 121 is stretched between a stud or plate 122 on the car frame and a pin 123 on the sleeve 115, the arrangement being such that the spring normally tends to rotate the resetting rod 114 anticlockwise.

From the foregoing detailed description it is thought that the construction, operation and use of the device will be fairly understood. However, a full review of the operation will now be given:

In Figures 2 and 3 the elements including the four shifter plates 46, 47, 48 and 49 (Figure 2) the draw plate operating lever 75, the slide bar 79, and all associated elements, including the escapement and pawl plates 65 and 69, and releasing cam 63 (the parts 63, 65, 69 etc. being shown in enlarged detail in Figure 12) are all shown in neutral position, ready for operation.

With the clutch fully engaged, the pin 82 of the bar 79 would normally be moved further rearward to a medial point on the left margin of the plate 30, under the action of the clutch spring A4, but according to Figures 2 and 3 the clutch pedal has been partially depressed, to the point where the pedal A3 is in lateral alignment with the stop 107. It does not itself contact the stop as it is spaced laterally therefrom to avoid direct contact, but the foot of the driver, moved slightly aside for the purpose, contacts the stop. This partial depression of the pedal has released the clutch and has advanced the bar 79 and pin 82 and roller 83 thereon, up against the nose 75e of the operating lever 75, but that lever itself has not been actuated, nor have any of its associated elements or any of the shifter plates been moved from their neutral positions.

With the elements positioned as stated, in order now to back the car, the resetting rod 114 is rotated clockwise by its handle 114a until the pin 114b aligns with the notch 112d of the bracket 112. A downward push upon the handle then forces the pin through the notch and pushes the bar 54 forwardly, carrying with it the saddle plate 55, selector arm 57 and head 58 with the guide lug 58d traveling forwardly in the slot 30b. This forward movement of the head 58 causes the lateral lobe 58a thereof to enter the lateral latch-notch 46d of the reverse shifter plate 46 just as the frontal margin of the saddle plate strikes the frontal loop 51 and aligns the lug 58d with the frontal guide groove 30c. The handle 114a of the resetting rod 114 is then turned anticlockwise, with the pin 114b under the bracket 112, thus holding the bar 54 to its forward position, with the arm 57 ready to draw out the plate 46 to operate the gearset for reverse travel. The clutch lever A is then fully depressed, projecting the slide bar 79 fully forwardly, causing pin 82 to force the nose 75e of the lever 75 also forwardly, thus swinging the legs 75c, 75d of this lever outwardly to the left, with leg 75c projecting beyond the left margin of the base plate 30. This outward movement of the slotted leg 75d of the lever draws out to the left the connected draw-plate 60, selector arm 57, and the engaged reverse shifter plate 46, with the lug 58d traveling in the aligned groove 30c. This action is illustrated in Figure 8, where the plate 46 is shown as drawn out, and the rollers 40 and 41 of the shifter bar 31 are forced rearwardly, the roller 40 playing through the "gear mesh" openings 46b, 47b of the two forwardly disposed and superposed reverse and first speed plates 46, 47, and the roller 41 through the neutral Y-shaped openings 48a, 49a of the two rearwardly disposed and superposed second and third speed plates 48, 49.

It will be noted from Figure 8 that in moving out to the left as stated, the diagonally disposed margin of the "gear mesh," opening 46b of reversing plate 46, has crowded the roller 40 (as also roller 41) rearward, thus moving the rear shift gear 20 on shaft 31 rearwardly into mesh with the reversing gear 26, in position to cause the car to back. Since the other and forward shift gear 19 (for second and third speeds) is controlled by the outer, or left hand shifter bar 32, having one of its rollers (42) playing through the Y-shaped neutral openings 46a, 47a of the two forward superposed plates 46, 47, it follows that as the plate 46 is drawn out to the left, with the described rearward movement of shifter bar 31 and reverse gear engagement, the Y-shaped neutral opening 46a of the same plate, will move the bar 32 and shift-gear 19 to neutral position (if not already there) by virtue of the centrally extended portion or stem of this opening 46a engaging the said roller and the latter entering thereinto.

Inasmuch as the same inter-relation, co-operation and mode of operation obtains as between all the shifter plates, the shifter bars, shift gears and controlling rollers and connections thereof, it follows there can be no clashing of gears or gear interference at any time or with any gear combination, and this is proved by actual experience in the practice of the invention. The backing of the car is then completed by releasing the clutch pedal and lever and allowing the clutch to reengage under the action of the clutch spring A4, in conventional manner.

After the first full depression of the clutch lever, with the resulting operation and setting of the parts as described above for reverse travel, and the clutch pedal and lever are released and the clutch allowed to reengage under the automatic action of the clutch spring, as the clutch reseats, the slide-bar 79 is forced fully rearward again, so that the pin 82 and roller 83 move to their normal position, about mid-way of the left margin of the base plate 30. But in this rearward movement of the bar 79, the roller 83 first must contact and press rearward against the rear or inner short margin of the slot 75g of the operating lever 75, starting the legs 75c, 75d of this lever to swing again towards the right. The roller 83 then emerges from the slot 75g, and traveling down the outer straight margin of the leg 75c forces both legs completely inward towards the right. The leg 75d through the described connections, carries with it the draw plate 60 with its cam 63 and the shifter plate selector arm 57 with its attached reverse shifter plate 46, the latter being thus restored to its original position of alignment with the other plates. This right hand movement of the plate 46 however does not affect the established reverse gear engagement of the shift gear 20, same being held against disengagement by the conventional interlock unit 36.

When the desired rearward travel of the car is completed, the handle 114a of the resetting rod 114 is rotated clock-wise again until the pin 114b is again aligned with the notch 112d of the bracket 112. The handle is then released, and the spring 118 forces the resetting rod upward, the pin 114b passing up through the notch 112d. This upward and rearward movement of the resetting rod now permits the carrier bar 54 to slide rearward under the pull of the spring 71, the guide-lug 58d of the head 58 of the selector arm 57 traveling in the slot 30b, until the rearmost one of the plate selector teeth 65b (the lower one in Figure 12) on the inner or right margin of the escapement plate 65 impinges the right hand pawl or stop tooth 69b of the reciprocating pawl plate 69 which at this time is normally pushed over to the left by the spring 70. This positioning of the parts is shown in Figure 12. The selector arm 57 is also simultaneously moved rearward with the carrier bar 54 to a position of operative alignment with the first speed shifter plate 47, and the elevated lobe 58b of the head 58 by this rearward movement of the arm 57 has entered the overhanging latch-notch 47d of this plate with the lug 58d aligned with the second groove 30c. The apparatus is now ready for first speed forward. First speed gear engagement is accomplished by a full depression of the clutch pedal and lever, which action draws out to the left the shifter plate 47, similarly as the plate 46 was drawn out, with the lug 58d traveling in the second aligned slot 30c. The leftward movement of the plate 47, through the forwardly inclined, diagonal rear margin of its "gear mesh" opening 47b, forces the roller 40 (as also its associate roller 41) forwardly and the shift-gear 20 also forwardly into mesh with the first speed gear 15, and as indicated in Figure 9. There has been no shifting of the shift gear 19, but had there been this gear would be returned to neutral position in advance of the first speed gear engagement through the quicker action of the steeper margins of the Y-shaped neutral opening 47a, in manner before pointed out. The clutch pedal is now released and the clutch reengaged for first speed forward.

On this second cycle of clutch operation and as the clutch reengages, all the elements, 79, 75, 60, 63, 57, 47, are returned again to their normal or original positions, similarly as in the operation of the plate 46. In this instance however, as the cam 63 moves to the right with the draw plate 60, immediately or an instant before the plate 47 is completely returned, the nose 63a of the cam 63 impinges the lug 69c of the pawl plate 69, with which it normally stands aligned as shown in Figure 12, kicking that plate to the right against the spring 70 and freeing the tooth 65b of the escapement plate 65 from the pawl tooth 69b and subjecting the plate 65 and bar 54 again to the rearward pull of the spring 71. Inasmuch as the lug 58d has now been returned to its home slot 30b, the said elements are subject to the pull of the spring 71. Instantly after the nose 63a strikes the lug 69c with the stated result, the plate 47 is completely returned into alignment with the other shifter plates, and simultaneously the rounded shoulder 63d of the cam 63 glances against the bevel 64b of the plate 64, and the nose 63a of the cam 63 is kicked forwardly off the lug 69c of the pawl 69. Simultaneously the opposite pawl tooth 69a moves to the right and engaged for an instant an advancing interceptor tooth 65a on the left margin of the escapement plate 65, limiting its further rearward movement until the spring 70 can again urge the pawl plate 69 over to the left. In the instant that the escapement tooth 65b is freed from the pawl tooth 69b, the spring 71 has pulled the escapement plate 65 and carrier bar 54 slightly rearward, enough to enable the tooth 65b to pass the pawl tooth 69b. The spring 70 then urges the plate 69 to the left, freeing the tooth 69a and simultaneously moving the pawl tooth 69b to the left, in the path of the next advancing or forwardly located plate selector tooth 65b of the plate 65, for engaging that tooth and thus aligning the shifter plate selector arm 57 with the second speed shifter plate 48 and the lug 58d with the third guide groove 30c. Coincidently the rearward movement of the plate selector arm 57 and head 58 moves the elevated lobe 58b into the overhanging latch-notch 48d of said plate and which is now ready for operation for second speed gear engagement.

A full depression of the clutch pedal and lever draws out the plate 48 to the left, as in the operation of the plates 46 and 47, and as shown in Figure 10, and the rearwardly inclined diagonal margin of its "gear mesh" opening or slot 48b which is located over the shifter bar 32 controlling second and third speed gear engagements, forces the roller 43 (as also its associate roller 42) rearwardly and the connected shift gear 19 rearwardly into mesh with the second speed gear 16. Simultaneously the roller 41 connected with shifter bar 31 and engaged by the Y-shaped neutral slot 48a of the same plate, moves or retains the connected shift gear 20 rearwardly to neutral position. The clutch being then reengaged, the car moves forward in second speed. As the clutch reengages the slide bar 79 moves rearwardly again, and the same sequences of action follow in the elements 79, 75, 60, 63, 57, 48, as in the previous operation of first speed plate 47, the plate 48 being returned to the others, the lug 58d to the groove 30b, and second speed gear engagement being maintained by the interlock unit 36.

On the return movement of the second speed shifter plate 48, and as the lug 58d enters its home slot 30b, the nose 63a of the cam 63 strikes the lug 69c and glances off after kicking the pawl plate 69 to the right and freeing the stop tooth 69b from the forward tooth 65b (the upper one in Figure 12), in the same manner as described above. When this action occurs the spring 71 again pulls the escapement plate 65 and carrier bar 54 and selector arm 57 rearwardly until the rear margin of the saddle plate 55 strikes the rear guide loop 52 and thereby aligns the arm 57 with third speed shifter plate 49. At the same time the lateral lobe 58c of the head 58 enters the lateral latch-notch 49d of the third speed shifter plate 49, and the guide lug 58d stands aligned with the fourth or rearmost guide groove 30c, the apparatus being now ready for third speed operation. Owing to the overhanging structure of the necks 47c, 48c of the plates 47, 48, through the under margins of which the latch-notches 47d, 48d are formed for direct alignment the elevated lobe 58b of the head 58 passes freely through the two, and when released from the notch 48d of the second speed plate 48, then passes directly into the final lateral notch 49d of the third speed plate 49, thus engaging that plate for third speed operation.

Third speed gear engagement is accomplished as before by a full depression of the clutch pedal and lever and subsequent release. This action draws out the third speed shifter plate 49 to the left, as shown in Figure 11, and the forwardly inclined diagonal margin of its "gear mesh" opening 49b over the shifter bar 32 controlling second and third speed gear engagements forces the roller 43 (as also its associate roller 42) forwardly, and the connected shift gear 19 forwardly and the internal gear teeth of its collar 21 into mesh over the rear extended end of the drive gear 12. Simultaneously the roller 41 connected with the shifter bar 31 and engaged by the Y-shaped neutral slot 49a of the same plate, moves or retains the connected shift gear 20 forwardly into neutral position. The clutch being then reengaged, the car moves forward in third speed. On each operation of the clutch, the carrier bar resetting lever 86 is oscillated between the spaced pins 79a, 79b of the slide bar 79. According to the drawing this oscillation of the lever 86 produces no effect when the reverse shifter plate 46 and the first speed shifter plate 47 are operated, but when the second speed shifter plate 48 is operated and drawn out to the left for second speed gear engagement, the extremity 96a of the trip finger 96 impinges the pin 93c of the latch 93, forcing the wedge 93b under the rear ledge or shoulder 91b of the cam block 91, raising the rear end of the cam block and lowering the forward end. This elevates the right end of the lever 86 which now rides upon the lower rear ledge 91b of the cam block 91, so that after the plate 48 is operated and the clutch is reengaged and the slide bar 79 moves rearward, and oscillates the right end of the lever 86 forward, this end is able to pass over the top of the resetting pin 54a, thus permitting the further rearward movement of the carrier bar 54 and selector arm 57 for operative alignment with the next or third speed shifter plate 49, for the subsequent operation thereof, as above described.

After the second speed plate 48 has been operated and returned, the right end of the lever 86 has thus been swung forwardly over the pin 54a and rests upon the higher ledge 91a of the cam block 91. Now as the clutch is again operated and draws the third speed plate 49 out to the left, the left rear corner of this plate impinges the forward end of the latch 93, withdrawing the wedge 93b and forcing the wedge 93a under the forward shoulder 91a of the cam block 91, thereby raising this shoulder and correspondingly lowering the rear ledge or shoulder 91b. Simultaneously with the forward movement of the slide bar 79, the right end of the resetting lever 86 which has been riding upon the forward ledge or shoulder 91a, is oscillated rearward over the top of the resetting pin 54a and falls by the pressure of the spring 88 rearwardly of that pin upon the now lowered end of the rear cam block shoulder 91b, to the position shown in Figure 14. Now as the clutch pedal and lever are released for the third speed gear engagement, and the slide bar 79 moves rearward, the right end of the resetting lever 86 is oscillated forward against the resetting pin 54a, and forces the carrier bar 54 forward again, to a position as shown in Figure 12, where the rearmost one of the teeth 65b of the escapement plate 65 is engaged by the tooth 69b of the pawl plate 69, thus again operatively aligning the selector arm 57 with the first speed shifter plate 47, and with the elevated lobe 58b of the head 58 engaged by the latch-notch 47d of that plate, ready for operation again of that plate and plates 48 and 49 in sequence and as described. Whatever the position of the gears may be, whether for first, second or third speed, the reverse shifter plate may always be engaged for operation by fully depressing the resetting rod 114 for projecting the carrier bar 54 fully forward again, as first described. Therefter the sequence of gear shifts will be automatically repeated. If at any time it is desired merely to release the clutch without changing gears, the clutch pedal is pushed down merely to the point where the foot (moved aside for the purpose) strikes the stop 107, which frees the clutch cone without projecting the slide rod 79 far enough forwardly to operate any of the shifter plates. The resetting rod 114 may be operated also by means of the foot pedal 119.

While the device is here shown as applied to a specific conventional form of transmission unit, it is evident that it may readily be adapted to other forms of gear asesmblies as might be desired, and while I have here shown and described a certain embodiment of the invention, and certain structural features thereof, any desired changes or alterations may be made therein, within the scope of the claims.

I claim:

1. In a speed gear operating device of the kind described, a base plate for mounting over the gear unit, sets of superposed shifter plates slidably mounted side by side on one side of the base plate and arranged to reciprocate in parallel lines, the plates having necks extended at one end in offset and spread relation, the necks being notched inwardly in a spaced, transverse and arcuate alignment, a carrier bar reciprocably mounted on the base plate adjacent the necks of the shifter plates, for movement transversely of the lines of movement of the shifter plates, a shifter plate selector arm transversely and reciprocably mounted on the carrier bar to move in parallelism with the shifter plates, the selector arm having a head formed and adapted to successively and releasably engage the notched necks of the shifter plates for individually selecting and operating same through the reciprocation of the selector arm, means for reciprocating the selector arm, and means for operating the carrier bar, including means for automatically moving the carrier bar and selector arm thereon the correct distance upon each reciprocation of the selector arm, to align the selector arm and head for engagement with the next following shifter plate.

2. In a shifting device for a motor vehicle having a sliding gear transmission unit providing for reverse travel and forward travel in first, second and third speeds, a clutch, a clutch lever mechanism and a steering mechanism on the vehicle, a base plate mounted over the transmission unit and extended laterally rearward of the clutch lever and steering mechanisms, pairs of flat, elongate and superposed shifter plates, including a reverse travel plate and plates for first, second and third speeds forward, said pairs of plates being slidably mounted side by side on the outer side of the base plate to reciprocate in parallelism, necks extended laterally towards the side of the vehicle carrying the clutch operating and steering mechanisms, the said necks being disposed in relative offset and spaced relation in transverse arcuate formation and being notched laterally through their adjacent centrally turned margins, means for selectively reciprocating the slide gears of the transmission unit by the reciprocation of the controlling shifter plates, a carrier bar slidably mounted through frontal and rear stop loops on the base plate in spaced relation to the necks of the shifter plates, for reciprocation transversely of the lines of movement of the shifter plates, the carrier bar being located rearwardly of the steering mechanism of the vehicle, means for normally drawing the carrier bar rearwardly, a shifter plate selector arm transversely and reciprocably mounted on the carrier bar for movement in parallelism with the lines of movement of the shifter plates, a head on the selector arm formed and adapted to releasably engage the notched necks of the shifter plates one at a time, a step by step escapement mechanism including coacting elements on the base plate and carrier bar, whereby the carrier bar may be successively stopped on its rearward movement with the selector arm properly aligned for engaging the selected shifter plate for operating same, a selector arm draw-plate mounted on the base plate outwardly of the carrier bar and arranged to reciprocate in parallelism with the selector arm, the inner margin of the draw-plate being straightly grooved to slidably engage the outer hooked end of the selector arm, means on the draw plate for operating, on each reciprocation thereof, the escapement mechanism of the carrier bar for retracting that bar a step and aligning the selector arm for engaging the next shifter plate in sequence, means on the base plate rearwardly of the clutch lever mechanism of the vehicle, for reciprocating the draw plate, means connecting the last named means with the clutch lever mechanism of the vehicle for operating the draw-plate by the clutch lever mechanism, means extended from the said carrier bar to the hand of the operator for drawing the carrier bar forwardly and resetting it, the frontal stop loop of the carrier bar serving to stop the selector arm properly aligned for engagement with the reverse travel shifter plate and the rear stop loop for aligning said arm with the third speed shifter plate, and means co-operatively operated by the means for reciprocating the selector arm draw plate and by the reciprocation of some of the shifter plates for automatically resetting the carrier bar and selector arm to a forward position after full retraction rearwardly.

3. In a device of the kind described, for operating a set of slidably mounted shifter plates arranged for controlling the several gear shifts of the gearset of a motor vehicle having a conventional self-engaging clutch and clutch lever located forwardly of the gearset, the clutch being releasable by the depression of the lever, the shifter plates being arranged in normally laterally spread alignment whence individual plates may be pulled out to one side for making a desired gear engagement, a carrier bar slidably mounted adjacent the out-moving ends of the shifter plates to reciprocate lengthwise, forwardly and rearwardly, transversely of their lines of movement as drawn out, means for moving the carrier bar rearward in a step-by-step measure, a plate selector arm transversely and reciprocably mounted on the carrier bar to reciprocate towards and from the shifter plates and to operatively align itself with individual plates under the said step-by-step rearward movement of the carrier bar, co-operative means on the plates and the plate selector arm for enabling the latter on its movement towards the plates to releasably engage, for operatively drawing out and returning individual shifter plates, means connecting the plate selector arm with the clutch lever for moving the former towards the shifter plate for engaging same, as the clutch engages, and for simultaneously operating the means controlling the step-by-step rearward travel of the carrier bar, and, as the clutch is disengaged, for drawing said plate out for a gear shift.

4. In a device according to claim 3, means for resetting the carrier bar forwardly for repeat action, after its rearward travel.

5. In a device of the kind described for operating a battery of shifter plates slidably mounted over and controlling the several gear shifts of the gearset of a motor vehicle having a forwardly located clutch unit including a spring set, normally engaged clutch and a lever, the clutch being disengaged by the depression of the lever, a carrier bar adjacent the out-moving ends of the shifter plates and arranged to reciprocate lengthwise forwardly and rearwardly across said ends, means for urging the carrier bar rearwardly, escapement mechanism imparting a step-by-step motion to the rearward travel of the carrier bar, means on the carrier bar for operating individual shifter plates of the battery, means connecting the plate operating means of the carrier bar with the clutch lever for controlling the former by the latter, and means for resetting the carrier bar forwardly after its rearward movement.

6. In a motor vehicle having a forwardly positioned clutch, spring-set for normal engagement, a clutch lever for disengaging the clutch by its depression, a rearwardly positioned gearset including shift gears for several speeds, and a battery of slidable shifter plates normally laterally and transversely aligned over the gearset for controlling the shift gears thereof, the plates being arranged to slide outwardly to one side for the purpose, a slide bar mounted in spaced relation to the out-moving ends of the shifter plates to reciprocate length-wise forwardly and rearwardly, connections between the slide bar and clutch lever to reciprocate same as the lever is depressed and released, means intermediate the slide bar and shifter plates for selectively and releasably engaging and drawing out to gearshift position individual shifter plates in sequence and thereafter returning the plate, and means controlled by the reciprocation of the slide bar for resetting the plate engaging and operating means for repeating its sequence of shifter plate operations.

7. In a device according to claim 6, means independent of the slide-bar for resetting the plate engaging and operating means for repeating its sequence of shifter plate operations.

8. In a shifting device for a motor vehicle having a forwardly located clutch and clutch lever unit including a spring to normally engage the clutch, the depression of the clutch lever disengaging same, and including a rearwardly located gearset having a pair of parallel gear shafts extended longitudinally towards the clutch lever mechanism, with fixed gears and shift gears mounted thereon, a base plate over the gearset, spaced shifter bars slidably mounted at the under side of the base plate in parallel relation to the gear shafts, connections between the shifter bars and shift gears for operating the latter by the reciprocation of the former, elements extended from the shifter bars up through elongate slots in the base plate extended parallel with the gear shafts, flat and elongate shifter plates equal in number to the gear shifts of the gearset, the plates having cam openings formed through their ends whereby they are transversely and reciprocably mounted over the elements extended from the shifter bars up through the base plate, said cam openings being formed at their margins to effect the required shifts through the reciprocation of the plates, a slide bar on the base plate to reciprocate forwardly and rearwardly transversely of the travel of the shifter plates, a carrier bar slidably mounted on the base plate to reciprocate in parallelism with the said slide bar, means impelling the carrier bar rearward, a plate selector arm slidably and transversely mounted on the carrier bar to reciprocate to and from the shifter plates, means on the plate selector arm co-operating with means on the shifter plate for engaging, drawing out and then retaining individual shifter plates, means for operatively aligning the plate selector arm with individual shifter plates for so engaging same, means connecting the plate selector arm with the said slide bar for reciprocating the former through the reciprocation of the latter, means connecting the slide bar with the clutch lever mechanism for projecting the former forwardly as the clutch lever is depressed and rearwardly as the clutch reengages, and means for projecting the carrier bar forwardly for resetting same after movement rearwardly.

9. In a device of the kind described for operating a set of laterally slidable gear controlling shifter plates as mounted over the gearset of a motor vehicle having a clutch unit located forwardly in the vehicle, a carrier rod slidably mounted laterally adjacent the plates for reciprocal movement towards and from the clutch unit, a plate selector arm transversely and slidably mounted on the carrier arm for reciprocal movement towards and from the shifter plates, means for enabling the plate selector arm to selectively and releasably engage individual shifter plates for operating same for gear shifting purposes, a draw plate slidably mounted at the outer end of the plate selector arm for reciprocal movement in parallelism with the movement of the plate selector arm, means for slidably connecting the end of the plate selector arm with the draw plate whereby the former may reciprocate laterally with and transversely of the latter, means connecting the draw plate with the clutch unit for reciprocating the former through the operation of the latter, means for normally urging the carrier bar rearwardly in a step by step manner for successively aligning the plate selector arm with individual shifter plates, and means for resetting the carrier arm forwardly after its rearward movement.

10. In a device according to claim 9, the said resetting means for the carrier arm being co-operatively controlled by the movements of certain of the shifter plates and the means for reciprocating the draw plate.

11. In a shifting device for a motor vehicle having a forwardly located and normally engaged clutch and a connected and self-returning lever which when depressed disengages the clutch, the vehicle having a rearwardly located gear transmission including shift gears for forming various speeds, a carrier bar having rearward step-by-step movement, a plurality of shifter plates, a plate selector arm to reciprocate towards and from said shifter plates and to operatively align with said plurality of plates individually under said step-by-step rearward movement of the said carrier bar, said carrier bar being mounted adjacent the said plurality of shifter plates and arranged to reciprocate forwardly and rearwardly transversely of said plates' lines of movement, means for moving the said carrier bar in a step-by-step manner, said plate selector arm being transversely and reciprocably mounted on the said carrier bar and on the succeeding rearward movement of the carrier bar being adapted to operate the said means for moving the carrier bar rearward in step-by-step manner, co-operative means on the plates and the said plate selector arm for enabling the latter on its movement towards the plates to releasably engage and operate said shifter plates individually, a slide bar supported outwardly of the carrier bar and arranged to reciprocate in parallelism therewith, means connecting the slide bar and clutch lever for projecting the former forwardly on the depression of the lever and rearwardly on its return movement, means connecting the slide bar and plate selector arm for moving the latter towards a shifter plate for engaging same on a rearward movement of the slide bar and for drawing same out for gear shift on the forward movements, the shifter plates being reciprocably mounted over gears with means connecting the plates and the shiftable gears for operating the latter by the reciprocation of the individual plates and means controlled by the slide bar for resetting the carrier bar forwardly after completing its rearward movement.

12. In a device according to claim 11, means independent of the slide bar controlled means for resetting the carrier bar forwardly at any stage of the operation.

JASPER BLACKBURN.